US012801295B2

(12) United States Patent
Xue

(10) Patent No.: US 12,801,295 B2
(45) Date of Patent: Nov. 17, 2026

(54) COMPUTER SYSTEM AND METHOD FOR PERFORMING A RANDOM ACCESS OF A BIT IN A MEMORY

(71) Applicant: STMicroelectronics International N.V., Geneva (CH)

(72) Inventor: Min Xue, Seyssinet-Pariset (FR)

(73) Assignee: STMicroelectronics International N.V., Geneva (CH)

( * ) Notice: Subject to any disclaimer, the term of this patent is extended or adjusted under 35 U.S.C. 154(b) by 40 days.

(21) Appl. No.: 18/977,736

(22) Filed: Dec. 11, 2024

(65) Prior Publication Data

US 2025/0199700 A1 Jun. 19, 2025

(30) Foreign Application Priority Data

Dec. 19, 2023 (FR) ...................................... 2314482

(51) Int. Cl.
*G06F 3/06* (2006.01)
*G06F 12/04* (2006.01)

(52) U.S. Cl.
CPC .......... *G06F 3/0625* (2013.01); *G06F 3/0611* (2013.01); *G06F 12/04* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 5,835,793 | A * | 11/1998 | Li | G06F 9/30018 712/E9.019 |
| 6,546,454 | B1 | 4/2003 | Levy et al. | |
| 7,262,722 | B1 | 8/2007 | Jahanghir et al. | |
| 7,932,843 | B2 | 4/2011 | Demircin et al. | |
| 9,312,881 | B2 | 4/2016 | Marpe et al. | |
| 2007/0226795 | A1 | 9/2007 | Conti et al. | |
| 2008/0240093 | A1 * | 10/2008 | Morad | H04L 49/901 370/535 |
| 2011/0280314 | A1 | 11/2011 | Sankaran et al. | |
| 2012/0155551 | A1 | 6/2012 | Sim et al. | |
| 2012/0195375 | A1 | 8/2012 | Wuebbolt | |
| 2013/0205125 | A1 | 8/2013 | Grocutt | |
| 2013/0326201 | A1 | 12/2013 | Gopal et al. | |
| 2017/0127071 | A1 | 5/2017 | Sinha et al. | |
| 2017/0185402 | A1 | 6/2017 | Ould-Ahmed-Vall et al. | |

(Continued)

FOREIGN PATENT DOCUMENTS

| | | | | |
|---|---|---|---|---|
| EP | 1331539 | A2 | 7/2003 | |
| WO | WO 2008002804 | A1 | 1/2008 | |
| WO | WO 2017074539 | A1 | 5/2017 | |

*Primary Examiner* — Kaushikkumar M Patel
(74) *Attorney, Agent, or Firm* — Seed IP Law Group LLP

(57) ABSTRACT

According to one aspect, a computer system is provided comprising: a data memory configured to store a byte array, a digital signal processor configured to execute a computer program stored in a program memory comprising instructions allowing accessing a bit in said byte array, said digital signal processor being configured to access each byte of said byte array, a dedicated circuit configured to read and/or write access a bit of a byte of said byte array using: a bit position pointer pointing towards the bit to be accessed in the byte array in combination, and said byte comprising the bit to be accessed.

15 Claims, 5 Drawing Sheets

(56) References Cited

U.S. PATENT DOCUMENTS

| | | | |
|---|---|---|---|
| 2019/0187994 | A1 | 6/2019 | Macchetti et al. |
| 2022/0327193 | A1 | 10/2022 | Ruelle |
| 2022/0405393 | A1 | 12/2022 | Ndu et al. |
| 2024/0135040 | A1 | 4/2024 | Vaassen |
| 2024/0193309 | A1 | 6/2024 | Wagner et al. |
| 2025/0077649 | A1 | 3/2025 | Giovannini |
| 2025/0156551 | A1 | 5/2025 | Mishra |
| 2025/0202508 | A1 | 6/2025 | Xue |

* cited by examiner

COMPUTER SYSTEM AND METHOD FOR PERFORMING A RANDOM ACCESS OF A BIT IN A MEMORY

BACKGROUND

Technical Field

Embodiments and implementations relate to random reading and writing of a bit in a data memory of a computer system.

Description of the Related Art

A computer system may comprise a data memory configured to store a byte array and a central processing unit configured to read and/or write access this data memory in order to read or write words in said byte array.

In general, the central processing unit is configured to read and/or write access the data memory in order to read 8-bit, 16-bit or 32-bit words.

There are some applications requiring a random reading and/or writing of a bit in a byte array stored in a data memory of a computer system. Random reading and/or writing refers to when reading and/or writing are carried out at unpredictable times. In particular, read and/or write accesses may be carried out to read and/or write each bit of the byte array. For example, a known application requiring random reading or writing of a bit in a data memory is encoding and decoding of an audio signal.

In these applications, memory accesses over 8 bits, 16 bits or 32 bits do not allow directly reading or writing a bit in the data memory.

In order to access only one bit in the byte array of the data memory, it is common to access the byte of said byte array including the bit to be accessed and then use a mask associated with the position of the bit to be accessed in said byte in order to select the bit in said byte. This access to the bit is carried out by software means by the central processing unit.

Such a method requires performing several tests and updates to access one single bit. In particular, the mask should be updated for each bit to be accessed. These tests and updates executed by software means might require several cycles of the central processing unit. Thus, such an access to said bit is relatively long to be carried out. Furthermore, such an access to said bit consumes a relatively large amount of energy because of the many cycles of the central processing unit that are required. Yet, for some applications, in particular for low-energy Bluetooth (also referred to by the acronym "BLE," standing for "Bluetooth Low Energy" in English), it is essential to minimize the energy consumption and the number of calculations for carrying out a given task.

Hence, there is a need to provide a solution allowing accessing a bit in a byte array more simply and more rapidly.

BRIEF SUMMARY

In some embodiments, a computer system is provided comprising: a data memory configured to store a byte array, and a program memory configured to store a computer program, a digital signal processor configured to execute a computer program comprising instructions allowing accessing a bit in said byte array, said digital signal processor being configured to access each byte of said byte array, and a dedicated circuit—in particular integrated in the digital signal processor—configured to read and/or write access a bit of a byte of said byte array using: a bit position pointer pointing towards the bit to be accessed in the byte array, and said byte comprising the bit to be accessed.

In some embodiments, the computer system uses a bit position pointer, and not a byte position pointer in combination with a mask.

In some embodiments, the computer system is configured to randomly access a bit in the memory using a dedicated circuit to carry out some instructions. This dedicated circuit occupies a small space in the computer system and substantially improves the delay for accessing a bit in the memory.

In some embodiments, the computer system is configured to randomly access a bit in the memory simply and rapidly. Such a dedicated circuit requires a few execution cycles of the digital signal processor to randomly access a bit in the memory.

In some embodiments, the dedicated circuit also allows reducing the energy consumption to randomly access a bit in the memory, because such an access is carried out by performing a few operations and in few cycles.

In some embodiments, the dedicated circuit comprises a first block configured to calculate a byte shift value according to the value of the bit position pointer.

In some embodiments, the first block of the dedicated circuit comprises:

- an "AND"-type logic gate configured to perform an "AND"-type logic operation between the value of the bit position pointer and the hexadecimal value 0x7 to obtain an index value,
- a comparison circuit configured to calculate the byte shift value by comparing the index value with 0, the byte shift value being equal to −1 when the index value is equal to 0 and equal to 0 otherwise.

In some embodiments, the dedicated circuit comprises a second block configured to determine the value of a bit to be read from the bit position pointer and a byte comprising said bit to be read.

In some embodiments, the second block of the dedicated circuit comprises: an adder circuit configured to increase the value of the bit position pointer by 1, an "AND"-type first logic gate configured to perform an "AND"-type logic operation between the increased value of the bit position pointer and a hexadecimal value equal to 0x7, a subtractor circuit configured to calculate a shift value by subtracting a value equal to 7 from the value at the output of the "AND"-type first logic gate, a shift circuit configured to shift to the right the value of the byte comprising said bit to be accessed by a number of bits corresponding to said shift value, an "AND"-type second logic gate configured to perform an "AND"-type logic operation between a value equal to 1 and the shifted value of the byte so as to obtain the value of the bit to be read.

In some embodiments, the dedicated circuit uses two blocks for reading a bit in the byte array. In some embodiments, all of the tests for reading a bit are carried out by the dedicated circuit, and not by a central processing unit of the computer system. In this manner, the random read access to a bit in the byte array of the data memory is carried out more rapidly.

In some embodiments, the computer program comprises instructions which, when they are implemented by the digital signal processor, lead the latter to perform at least one call of a function to read a bit in the byte array, each call of this function taking as input the bit position pointer and a byte pointer as attributes and causing: calculation of a byte shift value by said first block, then update of the byte pointer with said byte shift value, then determination of the value of the bit to be read by said second block of the dedicated circuit.

In some embodiments, to program such a reading of a bit in the byte array of said data memory, it is possible to use intrinsic functions that allow using said dedicated circuit. An intrinsic function is integrated into a compiler. This allows simplifying programming of such a random access to a bit in the data memory.

In some embodiments, the dedicated circuit comprises a third block configured to write the value of a bit instead of a bit pointed to by the bit position pointer in a byte on which to write.

In some embodiments, the third block of the dedicated circuit comprises: an adder circuit configured to increase the value of the bit position pointer by 1, an "AND"-type first logic gate configured to perform an "ADD"-type logic operation between the increased value of the bit position pointer and a hexadecimal value equal to 0x7, a subtractor circuit configured to calculate a shift value by subtracting a value equal to 7 from the value at the output of the "AND"-type first logic gate, a shift circuit configured to shift to the left the value 1 by a number of bits corresponding to said shift value to create a mask, an inverter logic gate configured to create a complementary mask from said mask obtained at the output of the shift circuit, an "AND"-type second logic circuit configured to apply the complementary mask on the byte on which to write to obtain a first byte B0, an "OR"-type logic circuit configured to apply the mask on the byte on which to write to obtain a second byte, and a selection circuit configured to generate a byte corresponding to the first byte if the value of the bit to be written is equal to 1 or corresponding to the second byte otherwise.

In some embodiments, the computer program comprises instructions which, when they are implemented by the digital signal processor, lead the latter to perform at least one call of a function to write a bit in the byte array, each call of this function taking as input the bit position pointer and a byte pointer as attributes and causing: calculation of a byte shift value by said first block, then update of the byte pointer with said byte shift value, then writing of the bit to be written by said third block of the dedicated circuit. To program such a writing of a bit in the byte array of said data memory, it is also possible to use intrinsic functions that allow using said dedicated circuit.

In some embodiments, the computer program comprises instructions which, when they are implemented by the digital signal processor, lead the latter to initiate the bit position pointer so that it points towards the position of the last bit of the byte array, and to decrement said bit position pointer at each read and/or write access.

In some embodiments, a method is provided, implemented by a computer system, for read and/or write accessing a bit of a byte stored in a byte array in a data memory of said computer system, the method comprising updating instructions of the computer program by a digital signal processor of the computer system causing: access to said byte stored in the data memory by the digital signal processor, update of a dedicated circuit of the computer system—in particular integrated in the digital signal processor—to read and/or write access said bit of the byte accessed by the digital signal processor using: a bit position pointer pointing towards the bit to be accessed in the byte array, and said byte comprising the bit to be accessed.

In some embodiments, the method comprises implementing a first block of the dedicated circuit to calculate a byte shift value according to the value of the bit position pointer.

In some embodiments, the implementation of the first block of the dedicated circuit causes: implementation of an "AND"-type logic gate of the first block to perform an "AND"-type logic operation between the value of the bit position pointer and the hexadecimal value 0x7 to obtain an index value, implementation of a comparison circuit of the first block to calculate the byte shift value by comparing the index value with 0, the byte shift value being equal to −1 when the index value is equal to 0 and equal to 0 otherwise.

In some embodiments, the method further comprises implementing a second block of the dedicated circuit to determine the value of a bit to be read from the bit position pointer and a byte comprising said bit to be read.

In some embodiments, the implementation of the second block of the dedicated circuit causes: implementation of an adder circuit of the second block to increase the value of the bit position pointer by 1, implementation of an "AND"-type first logic gate of the second block to perform an "AND"-type logic operation between the increased value of the bit position pointer and a hexadecimal value equal to 0x7, implementation of a subtractor circuit of the second block to calculate a shift value by subtracting a value equal to 7 from the value at the output of the "AND"-type first logic gate, implementation of a shift circuit of the second block to shift to the right the value of the byte comprising said bit to be accessed by a number of bits corresponding to said shift value, and implementation of an "AND"-type second logic gate of the second block to perform an "AND"-type logic operation between a value equal to 1 and the shifted value of the byte so as to obtain the value of the bit to be read.

In some embodiments, the method comprises implementing instructions of the computer program by the digital signal processor causing at least one call of a function to read a bit in the byte array, each call of this function taking as input the bit position pointer and a byte pointer as attributes and causing: calculation of a byte shift value by said first block, then update of the byte pointer with said byte shift value, then determination of the value of the bit to be read by said second block of the dedicated circuit.

In some embodiments, the method further comprising implementing a third block of the dedicated circuit to write the value of a bit instead of a bit pointed to by the bit position pointer in a byte on which to write.

In some embodiments, the implementation of the third block of the dedicated circuit causes: implementation of an adder circuit of the third block to increase the value of the bit position pointer by 1, implementation of an "AND"-type first logic gate of the third block to perform an "AND"-type logic operation between the increased value of the bit position pointer and a hexadecimal value equal to 0x7, implementation of a subtractor circuit of the third block to calculate a shift value by subtracting a value equal to 7 from the value at the output of the "AND"-type first logic gate, implementation of a shift circuit of the third block to shift to the left the value 1 by a number of bits corresponding to said shift value to create a mask, implementation of an inverter logic gate of the third block to create a complementary mask from said mask obtained by implementation of the shift circuit, implementation of an "AND"-type second logic circuit of the third block to apply the complementary mask on the byte on which to write to obtain a first byte, implementation of an "OR"-type logic circuit of the third block to apply the mask on the byte on which to write to obtain a second byte, and implementation of a selection circuit to generate a byte BTE_OUT corresponding to the first byte if the value of the bit to be written is equal to 0 or corresponding to the second byte otherwise.

In some embodiments, implementing instructions of the computer program by the digital signal processor comprises causing at least one call of a function to write a bit in the byte array, each call of this function taking as input the bit position pointer and a byte pointer as attributes and causing: calculation of a byte shift value by said first block, then update of the byte pointer with said byte shift value, then writing of the bit to be written by said third block of the dedicated circuit.

In some embodiments, the method comprises implementing instructions of the computer program by the digital signal processor causing initiation of the bit position pointer so that it points towards the position of the last bit of the byte array, and decrementing said bit position pointer at each read and/or write access.

BRIEF DESCRIPTION OF THE SEVERAL VIEWS OF THE DRAWINGS

Other advantages and features of the disclosure will appear upon examining the detailed description of non-limiting embodiments, and from the appended drawings, wherein.

DETAILED DESCRIPTION

Figure 1:
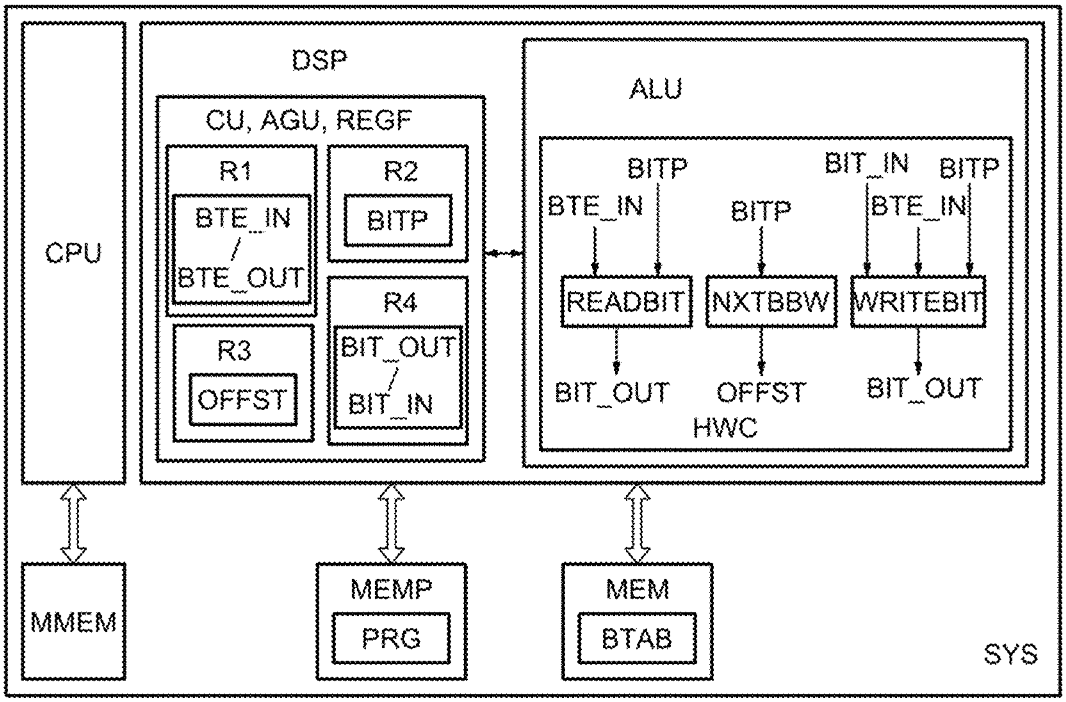
FIG. 1 illustrates a computer system for randomly accessing a bit in memory in some embodiments.

FIG. 1 illustrates an embodiment of a computer system SYS. The computer system SYS comprises a central processing unit CPU and a central memory MMEM. The computer system also comprises a digital signal processor (i.e., "DSP") with a data memory MEM, a program memory MEMP and a circuit HWC dedicated to read and/or write access a bit in a byte. The latter is integrated into an arithmetic and logic unit (i.e., "ALU") of the digital signal processor DSP. The digital signal processor DSP also contains a control unit (i.e., "CU"), an address generation unit (i.e., "AGU") and a register file. The computer system SYS may be a system-on-chip.

The data memory MEM is configured to store a byte array BTAB. The memory MEM may be read or write accessed by the digital signal processor DSP. Each access to the memory by the digital signal processor DSP is carried out for words having a minimum size of one byte. Thus, the digital signal processor DSP can access each byte of the byte array BTAB of the memory MEM. The digital signal processor DSP may place the loaded bytes in its registers which serve as buffers between, the data memory MEM and the ALU of the digital signal processor DSP. Nevertheless, the digital signal processor DSP cannot directly read or write a bit in said byte array.

The data of the byte array BTAB may correspond to compressed data of an audio data stream. In particular, the audio data stream comprises a succession of audio samples. These samples may be compressed in order to reduce their size. For example, the samples may be independently compressed over one bit, two bits, three bits or four bits. Each bit of the audio data stream may have its own meaning. The value of each bit of the data stream may influence the action to be taken in the decompression process for example. This is why it is important to be able to access a bit of the compressed audio data stream. Hence, it is important to be able to access each bit of the byte array stored in memory.

The digital signal processor DSP is configured to execute a computer program PRG comprising instructions which, when they are implemented in the digital signal processor DSP, lead the latter to carry out a read and/or write access to a bit of a byte of the byte array stored in memory. This computer program PRG may be stored in the program memory MEMP of the computer system SYS.

The digital signal processor DSP may allocate a first register R1 to store a read byte BTE_IN in the byte array BTAB stored in the memory MEM. The digital signal processor DSP may also allocate a second register R2 to store a position pointer BITP of the bit to access in the byte array BTAB. The digital signal processor DSP may also allocate a third register R3 to store a byte shift value OFFST. The digital signal processor DSP may also allocate a fourth register R4 to store a value of the bit to be accessed BIT_OUT. To write a bit, the digital signal processor DSP uses the register R4 to store the bit BIT_IN to be written in the byte BTE_IN contained in the register R1. It reuses the register R1 to store the resulting byte BTE_OUT with said bit written at the output.

In particular, the circuit HWC may be obtained from a code "Register Transfer Level" (i.e., "RTL")

Figure 2:
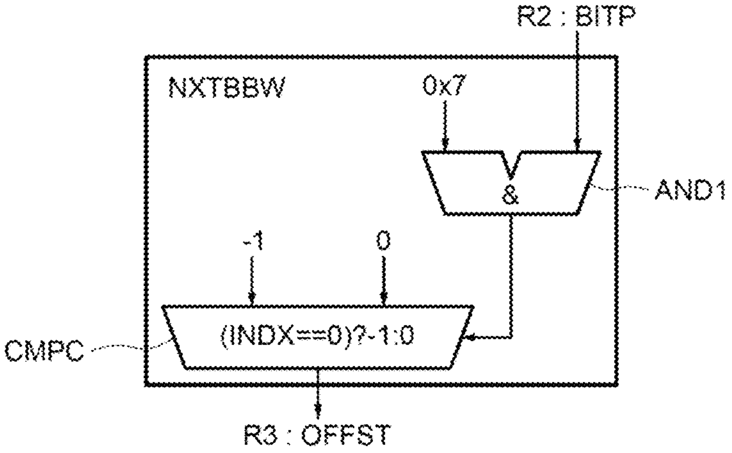
FIG. 2 is a block diagram illustrating logic usable to determine a next value of a byte shift OFFST in some embodiments.

The dedicated circuit HWC comprises a first block NXTBBW configured to determine the next value of the byte shift OFFST. Such a first block NXTBBW is illustrated in FIG. 2.

In particular, the first block NXTBBW is configured to receive as input the value of the bit position pointer BITP stored in the second register R2.

This first block NXTBBW comprises an "AND"-type logic gate AND1. The logic gate AND1 is configured to receive as input the value of the bit position pointer BITP as well as a mask with a value '0x7' (in hexadecimal). The "AND"-type logic gate is configured to apply the mask with the value '0x7' on the value of the bit position pointer BITP. Thus, the "AND"-type logic gate allows knowing from the three least significant bits of the bit position pointer BITP whether the byte pointer should be pre-adjusted or not via the byte shift OFFST.

The logic gate AND1 is configured to generate as output an index value INDX. In particular, the index value INDX over one byte is comprised between 0 and 7. Thus, all it needs is to watch the three least significant bits of the bit position pointer to know the index value INDX.

The first block NXTBBW also comprises a comparison circuit CMPC taking as input the index value INDX. The comparison circuit CMPC allows verifying whether the index value is 0. If the index value is 0, this means that there remains only one single bit of the byte to be read because the others have already been read before. In this case, the byte shift value should be modified to process the next byte in the byte array after having read the last bit of the current byte.

In particular, the comparison circuit CMPC also takes as input two parameters with the values '−1' and '0.'

Thus, the comparison circuit CMPC is configured to compare the index value INDX with the value '0' and to generate the next value of the byte shift according to the result of this comparison. In particular, the comparison circuit CMPC is configured to generate a next value of the byte shift OFFST at '−1' when the index value is equal to '0,' and at '0' when the index value is different from '0.' Afterwards, this next value of the byte shift OFFST is stored in the third register R3.

The first block NXTBBW is then configured to determine the byte shift value OFFST in one single cycle in the digital signal processor DSP.

Figure 3:
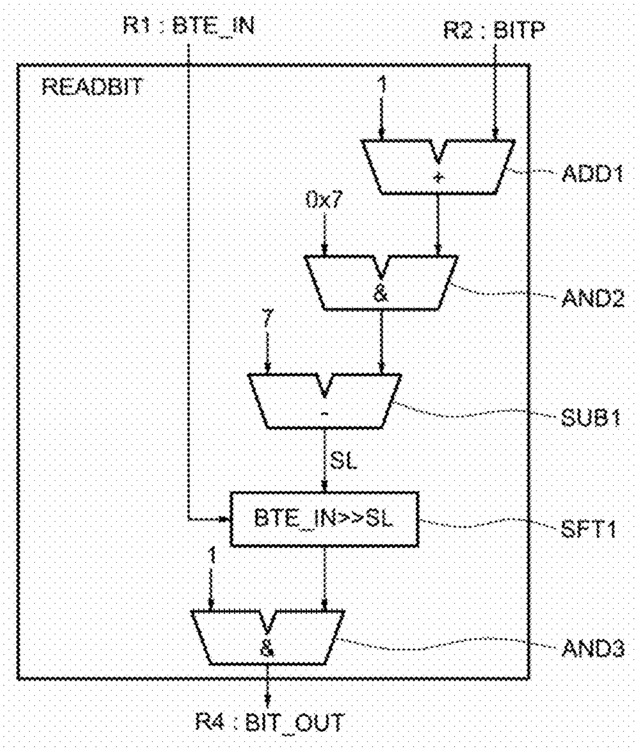
FIG. 3 is a logic circuit diagram illustrating logic to read a selected bit.

The dedicated circuit HWC comprises a second block READBIT configured to determine the value BIT_OUT of a given bit in a byte BTE_IN. Such a second block READBIT is illustrated in FIG. 3. The second block READBIT is configured to receive as input the value BITP of the bit position pointer stored in the second register R2 as well as the byte BTE_IN stored in the first register R1.

The second block READBIT comprises an adder circuit ADD1 configured to receive as input the value of the bit position pointer BITP as well as a value equal to '1.' Thus, the adder circuit ADD1 is configured to add '1' to the value of the bit position pointer BITP.

The second block READBIT also comprises an "AND"-type first logic gate AND2 configured to receive as input the value of the bit position pointer BITP increased by '1' and a mask with a hexadecimal value '0x7.'

The second block READBIT also comprises a subtractor circuit SUB1 configured to receive as input a value equal to '7' and the value generated at the output of the logic gate AND2. This subtractor circuit SUB1 is configured to generate a value SL corresponding to the difference between the value '7' and the value generated at the output of the logic gate AND2.

Hence, the value SL is calculated by the following formula: SL=7−(BITP+1)&0x7.

The second block READBIT also comprises a shift register SFT1 configured to receive the byte BTE_IN stored in the first register R1 and to shift this byte BTE_IN to the right by a number of bits corresponding to the value SL.

The second block READBIT also comprises an "AND"-type second logic gate AND3 configured to receive as input a value equal to '1' and the offset byte generated at the output of the shift register SFT1. Thus, this logic gate AND3 allows generating as output the value BIT_OUT of the least significant bit of the shifted byte. This value corresponds to the value of the bit of the byte BTE_IN stored in the first register located at the position pointed at by the bit position pointer BITP. Afterwards, this value BIT_OUT of the bit of the byte BTE_IN is stored in the fourth register R4.

Thus, the second block READBIT allows determining the value BIT_OUT of the bit of the byte BTE_IN stored in the first register R1 located at the position pointed at by the bit position pointer BITP. In particular, the second block READBIT is configured to determine the value BIT_OUT in one single cycle of the digital signal processor DSP.

Figure 5:
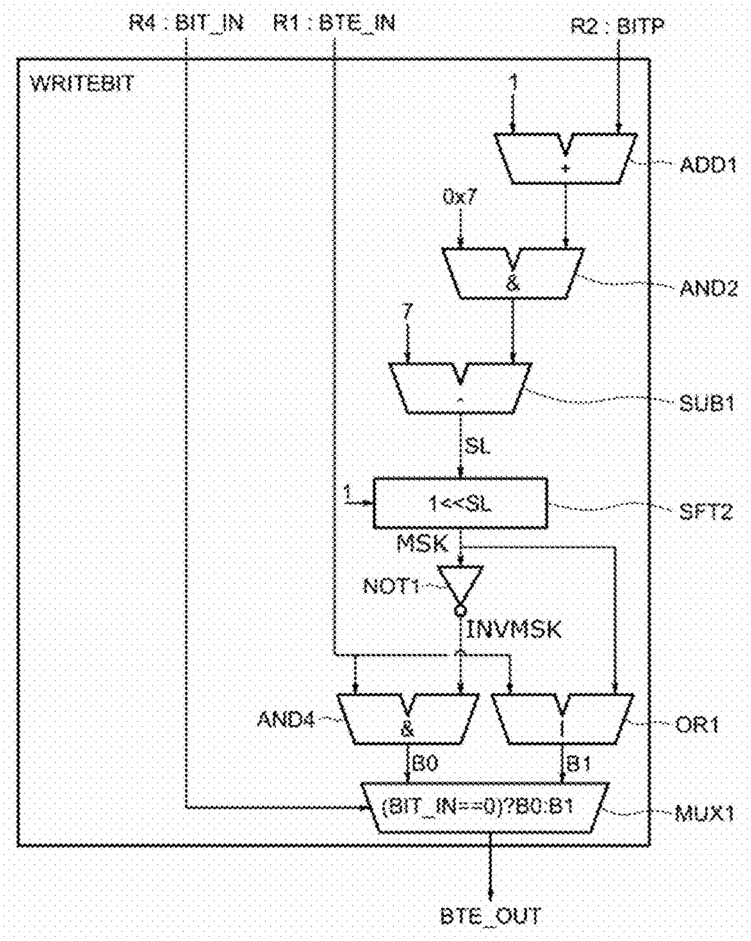
FIG. 5 is a logic circuit diagram illustrating logic to write to a selected bit in some embodiments.

The third block WRITEBIT is configured to write a bit BIT_IN at a position BITP in a byte BTE_IN stored in the first register R1. Such a third block WRITEBIT is illustrated in FIG. 5.

The third block WRITEBIT is configured to receive as input the value of the bit BIT_IN stored in the fourth register R4, the value BITP of the bit position pointer stored in the second register R2 as well as the byte BTE_IN stored in the first register R1.

The third block WRITEBIT comprises an adder circuit ADD1 configured to receive as input the value of the bit position pointer BITP as well as a value equal to '1.' Thus, the adder circuit ADD1 is configured to add '1' to the value of the bit position pointer BITP.

The third block WRITEBIT also comprises an "AND"-type first logic gate AND2 configured to receive as input the value of the bit position pointer BITP increased by '1' and a mask with a hexadecimal value '0x7.'

The third block WRITEBIT also comprises a subtractor circuit SUB1 configured to receive as input a value equal to '7' and the value generated at the output of the logic gate AND2. This subtractor circuit SUB1 is configured to generate a value SL corresponding to the difference between the value '7' and the value generated at the output of the logic gate AND2.

Hence, the value SL is calculated by the following formula: SL=7−(BITP+1)&0x7.

The third block WRITEBIT also comprises a shift register SFT2 configured to calculate a mask MSK. This mask MSK is intended to insert the input bit BIT_IN in the byte BTE_IN. In particular, the shift register SFT2 is configured to shift the value 1 to the left by a number of bits corresponding to the value SL to obtain the mask MSK.

The third block WRITEBIT further comprises an inverter gate NOT1 configured to invert the mask MSK so as to obtain a complementary mask INVMSK.

The third block WRITEBIT also comprises an "AND"-type second logic gate AND4 configured to apply the complementary mask INVMSK on the byte BTE_IN. Thus, this logic gate AND4 allows generating as output a first byte B0.

The third block WRITEBIT also comprises an "OR"-type logic gate OR1 configured to perform an "OR"-type logic operation between the mask MSK and the byte BTE_IN. Thus, this logic gate OR1 allows generating a second byte B1 at the output.

The third block WRITEBIT also comprises a selection circuit MUX1 configured to receive the bytes B0 and B1 and to generate a byte BTE_OUT corresponding to the byte B0 or to the byte B1 according to the value of the bit BIT_IN. In particular, if the value of the bit BIT_IN is equal to 0 then the byte BTE_OUT corresponds to the byte B0. Otherwise, the byte BTE_OUT corresponds to the byte B1. In particular, the selection circuit MUX1 may be a multiplexer.

The byte BTE_OUT obtained at the output of the selection circuit MUX1 corresponds to the byte BTE_IN in which the bit pointed to by the bit position pointer BITP has been modified by the value of the bit BIT_IN.

Thus, the third block WRITEBIT allows writing the value of the bit BIT_IN in the byte BTE_IN at the position pointed to by the bit position pointer BITP. In particular, the third block WRITEBIT is configured to write said bit in the byte BTE_IN in one single cycle of the digital signal processor DSP. The resulting byte BTE_OUT with said written bit is stored in the register R1 at the output.

The third block WRITEBIT may share the circuits ADD1, AND2 and SUB1 with the second block READBIT. Alternatively, the circuits ADD1, AND2 and SUB1 of the second block READBIT and of the third block WRITEBIT may be distinct.

As seen before, the digital signal processor DSP is configured to execute a computer program comprising instructions which, when the program is executed, lead the digital signal processor DSP to carry out a read and/or write access to a bit of a byte of the byte array stored in memory. In particular, the execution of said instructions lead the digital signal processor DSP to execute a function RD_BIT_NW or a function WRT_BIT_NW.

The function RD_BIT_NW is configured to randomly read access a bit in a byte array stored in the memory MEM.

In particular, this function RD_BIT_NW is called several times to read all of the bits of the byte array BTAB.

Figure 4:
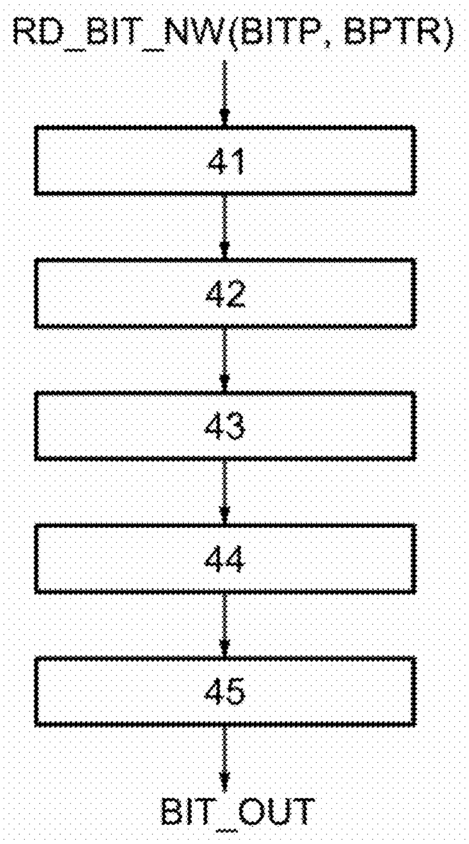
FIG. 4 is a logical flow diagram illustrating a process to read a selected bit in some embodiments.

In particular, the computer program PRG is configured to implement the method for read accessing a bit stored in the byte array BTAB illustrated in FIG. 4.

More particularly, the computer program PRG comprises instructions allowing performing an initiation step 40. This step 40 allows initiating the bit position pointer BITP at the value of a length of the sequence of bits of the byte array BTAB reduced by one. This step 40 also allows initiating the byte pointer at the address of the last byte in the byte array BTAB stored in the memory MEM.

Afterwards, said function RD_BIT_NW may be called several times to read the different bits of the byte array BTAB. The call of the function RD_BIT_NW allows performing the steps 41, 42, 43, 44 and 45 described hereafter. At each call of the function RD_BIT_NW, these steps 41, 42, 43, 44 and 45 are therefore executed.

In particular, said function RD_BIT_NW is configured to pre-calculate a next value of a byte shift. To do so, in step 41, the function RD_BIT_NW uses the instruction NXTBBW implemented by the first block NXTBBW of said dedicated circuit. The pre-calculation of the next value of a byte shift allows knowing the next byte to be used for the next read access carried out for a next implementation of the function RD_BIT_NW. The instruction NXTBBW allows anticipating the calculation of the next value of the byte shift before performing reading of the bit in the current byte. This allows reducing the execution time of the function RD_BIT_NW by reducing the number of execution cycles of the digital signal processor DSP.

Afterwards, said function RD_BIT_NW is configured to decrement the bit position pointer BITP, in step 42. Thus, the decremented bit position pointer BITP points towards the position of the next bit in the byte array BTAB.

Afterwards, said function RD_BIT_NW is configured to read the current byte pointed at by the byte pointer BPTR in the byte array, in step 43.

Afterwards, said function RD_BIT_NW is configured to update the byte pointer BPTR by adding the value of the byte shift to the byte pointer BPTR, in step 44.

Afterwards, said function RD_BIT_NW is configured to read and then return the current bit, in step 45. To do so, the function RD_BIT_NW uses the instruction READBIT implemented by the second block READBIT of said dedicated circuit.

In a "multiple issue" or "multi-thread" type processor, i.e., which can execute several instructions in parallel while taking account of the data dependencies between them, these steps 41, 42, 43, 44 and 45 may be executed either sequentially or in parallel.

The function RD_BIT_NW uses only the bit position pointer BITP instead of a byte pointer BPTR and a mask to read a bit in a byte array. Hence, the function RB_BIT_NW uses only one variable instead of two variables. Starting from the bit position pointer BITP, using the first block NXTBBW of the dedicated circuit, it is possible to determine an index value of the bit to be read in the current byte of the byte array and to calculate the shift value for the byte containing the next bit to be read. The first block NXTBBW and the second block READBIT of the dedicated circuit HWC are configured to perform all of the calculations and tests to extract the bit to be read of a byte of a byte array. This allows performing reading of the bit more rapidly. For example, the use of the dedicated circuit allows being twice as rapid as a read access performed only by software means using a byte pointer and a mask.

Such a function RD_BIT_NW may be used in all applications requiring random read access to a bit in a byte array of the memory. In particular, the function RD_BIT_NW may be used in any audio encoder-decoder requiring random read access to a bit in a byte array of the memory. More particularly, the function RD_BIT_NW may be implemented in the "LC3" audio encoder-decoder (standing for "Low Complexity Communication Codec" in English). For example, the function RD_BIT_NW may be implemented during decoding of an audio data stream.

The computer program may also comprise instructions which, when the program is executed by the digital signal processor DSP, lead the latter to execute a function WRT_BIT_NW. This function WRT_BIT_NW allows random write access to a bit in the byte array stored in the memory.

The function WRT_BIT_NW is configured to randomly write accessing a bit in a byte array stored in the memory MEM. In particular, this function WRT_BIT_NW is called several times to write on all of the bits of the byte array BTAB.

Figure 6:
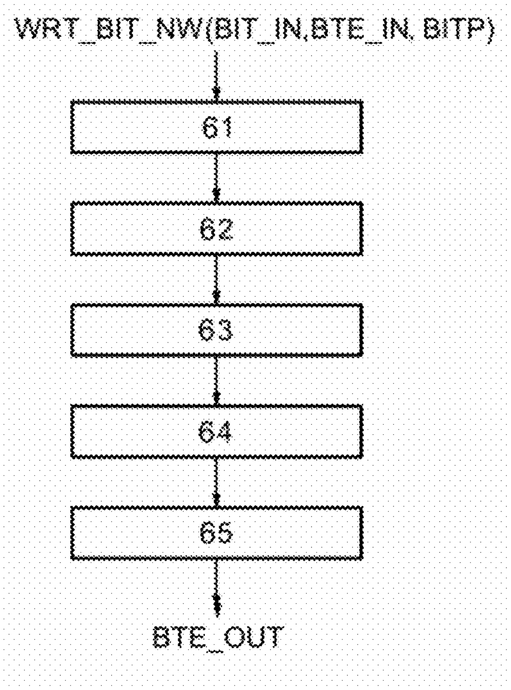
FIG. 6 is a logical flow diagram illustrating a process to write to a selected bit in some embodiments.

In particular, the computer program PRG is configured to implement the process of write accessing a bit in the byte array BTAB illustrated in FIG. 6.

More particularly, the computer program PRG comprises instructions allowing performing an initiation step 60. This step 60 allows initiating the bit position pointer BITP at the value of a length of the sequence of bits of the byte array BTAB reduced by one. This step 60 also allows initiating the byte pointer at the address of the last byte in the byte array BTAB stored in the memory MEM.

Afterwards, said function WRT_BIT_NW may be called several times to write on the different bits of the byte array BTAB. The call of the function WRT_BIT_NW allows performing the steps 61, 62, 63, 64 and 65 described hereafter. At each call of the function WRT_BIT_NW, these steps 61, 62, 63, 64 and 65 are therefore executed.

In particular, said function WRT_BIT_NW is configured to pre-calculate a next value of a byte shift. To do so, in step 61, the function WRT_BIT_NW uses the instruction NXTBBW implemented by the first block NXTBBW of said dedicated circuit. The pre-calculation of the next value of a byte shift allows knowing the next byte to be used for the next write access carried out for a next implementation of the function WRT_BIT_NW. The instruction NXTBBW allows anticipating the calculation of the next value of the byte shift before performing writing of the bit in the current byte. This allows reducing the execution time of the function WRT_BIT_NW by reducing the number of execution cycles of the digital signal processor DSP.

Afterwards, said function WRT_BIT_NW is configured to decrement the bit position pointer, in step 62. Thus, the decremented bit position pointer points towards the position of the next bit in the byte array BTAB.

Afterwards, said function WRT_BIT_NW is configured to read the current byte pointed by the byte pointer in the byte array, in step 63.

Afterwards, said function WRT_BIT_NW is configured to update the byte pointer by adding the value of the byte shift to the byte pointer, in step 64.

Afterwards, said function WRT_BIT_NW is configured to write a bit BIT_IN in the current bit, in step 65. To do so, the function WRT_BIT_NW uses the instruction WRITEBIT implemented by the third block WRITEBIT of said dedicated circuit.

In a "multiple issue" or "multi-thread" type processor, these steps 61, 62, 63, 64 and 65 may be executed either sequentially or in parallel.

The function WRT_BIT_NW uses only the bit position pointer instead of a byte pointer and of a mask to write a bit in a byte array. Hence, the function WRT_BIT_NW uses only one variable instead of two variables. Starting from the bit position pointer, using the first block NXTBBW of the dedicated circuit, it is possible to determine an index value of the bit on which to write in the current byte of the byte array and to calculate the shift value for the byte containing the next bit on which to write. The first block NXTBBW and the third block WRITEBIT of the dedicated circuit HWC are configured to perform all of the calculations and tests to write on a bit of a byte array. This allows performing writing of a bit more rapidly. For example, the use of the dedicated circuit allows being twice as rapid than a write access performed only by software means using a byte pointer and a mask.

Such a function WRT_BIT_NW may be used in all applications requiring random write access to a bit in a byte array of the memory. In particular, the function WRT-_BIT_NW may be used in any audio encoder-decoder requiring random read access to a bit in a byte array of the memory. More particularly, the function WRT_BIT_NW may be implemented in the “LC3” audio encoder-decoder (standing for “Low Complexity Communication Codec” in English).

Moreover, the dedicated circuit HWC of the computer system SYS has the advantage of being less expensive and occupies a small space in the computer system. The use of such a dedicated circuit has no impact on the maximum frequency of the digital signal processor. The use of such a dedicated circuit also allows reducing the energy consumption to read a bit in a byte array in the memory.

A computer system may be summarized as including: a data memory (MEM) configured to store a byte array (BTAB), and a program memory (MEMP) configured to store a computer program (PRG), a digital signal processor (DSP) configured to execute a computer program (PRG) including instructions allowing accessing a bit in said byte array (BTAB), said digital signal processor (DSP) being configured to access each byte of said byte array, a dedicated circuit (HWC) configured to read and/or write access a bit of a byte of said byte array using: a bit position pointer (BITP) pointing towards the bit to be accessed in the byte array, and said byte (BTE_IN) including the bit to be accessed.

The dedicated circuit (HWC) may include a first block (NXTBBW) configured to calculate a byte shift value according to the value of the bit position pointer.

The first block (NXTBBW) of the dedicated circuit (HWC) may include: an “AND”-type logic gate (AND1) configured to perform an “AND”-type logic operation between the value of the bit position pointer (BITP) and the hexadecimal value 0x7 to obtain an index value (INDX), and a comparison circuit (COMPC) configured to calculate the byte shift value by comparing the index value (INDX) with 0, the byte shift value being equal to −1 when the index value is equal to 0 and equal to 0 otherwise.

The dedicated circuit (HWC) may include a second block (READBIT) configured to determine the value of a bit to be read from the bit position pointer (BITP) and a byte (BTE_IN) may include said bit to be read.

The second block (READBIT) of the dedicated circuit (HWC) may include: an adder circuit (ADD1) configured to increase the value of the bit position pointer by 1, an “AND”-type first logic gate (AND2) configured to perform an “AND”-type logic operation between the increased value of the bit position pointer and a hexadecimal value equal to 0x7, a subtractor circuit (SUB1) configured to calculate a shift value (SL) by subtracting a value equal to 7 from the value at the output of the “AND”-type first logic gate (AND2), a shift circuit (SFT1) configured to shift to the right the value of the byte may include said bit to be accessed by a number of bits corresponding to said shift value (SL), and an “AND”-type second logic gate (AND3) configured to perform an “AND”-type logic operation between a value equal to 1 and the shifted value of the byte so as to obtain the value (BIT_OUT) of the bit to be read.

The computer program (PRG) may include instructions which, when they are implemented by the digital signal processor, lead the latter to perform at least one call of a function (RD_BIT_NW) to read a bit in the byte array (BTAB), each call of this function taking as input the bit position pointer and a byte pointer as attributes and causing: calculation of a byte shift value by said first block (OFFST), then update of the byte pointer with said byte shift value, then determination of the value of the bit to be read by said second block (READBIT) of the dedicated circuit (HWC).

The dedicated circuit (HWC) may include a third block (WRITEBIT) configured to write the value of a bit instead of a bit pointed to by the bit position pointer (BITP) in a byte (BTE_IN) on which to write.

The third block (WRITEBIT) of the dedicated circuit (HWC) may include: an adder circuit (ADD1) configured to increase the value of the bit position pointer by 1, an “AND”-type first logic gate (AND2) configured to perform an “ADD”-type logic operation between the increased value of the bit position pointer and a hexadecimal value equal to 0x7, a subtractor circuit (SUB1) configured to calculate a shift value (SL) by subtracting a value equal to 7 from the value at the output of the “AND”-type first logic gate (AND2), a shift circuit (SFT2) configured to shift to the left the value 1 by a number of bits corresponding to said shift value (SL) to create a mask (MSK), an inverter logic gate (NOT1) configured to create a complementary mask (INVMSK) from said mask (MSK) obtained at the output of the shift circuit (SFT2), an “AND”-type second logic circuit (AND4) configured to apply the complementary mask (INVMSK) on the byte (BTE_IN) on which to write to obtain a first byte (B0), an “OR”-type logic circuit (OR1) configured to apply the mask (MSK) on the byte (BTE_IN) on which to write to obtain a second byte (B1), and a selection circuit (MUX1) configured to generate a byte (BTE_OUT) corresponding to the first byte (B0) if the value of the bit to be written is equal to 0 or corresponding to the second byte (B1) otherwise.

The computer program (PRG) may include instructions which, when they are implemented by the digital signal processor, lead the latter to perform at least one call of a function (WRT_BIT_NW) to write a bit in the byte array (BTAB), each call of this function taking as input the bit position pointer and a byte pointer as attributes and causing: calculation of a byte shift value by said first block (OFFST), then update of the byte pointer with said byte shift value, then writing of the bit to be written by said third block (WRITEBIT) of the dedicated circuit (HWC).

The computer program (PRG) may include instructions which, when they are implemented by the digital signal processor (DSP), lead the latter to initiate the bit position pointer so that it points towards the position of the last bit of the byte array (BTAB), and to decrement said bit position pointer (BITP) at each read and/or write access.

A method, implemented by a computer system (SYS), for read and/or write accessing a bit of a byte stored in a byte array (BTAB) in a data memory (MEM) of said computer system, the method may be summarized as including updating instructions of the computer program (PRG) stored in a program memory (MEMP) by a digital signal processor (DSP) of the computer system (SYS) causing: access to said byte stored in the data memory (MEM) by the digital signal processor (DSP), update of a dedicated circuit (HWC) of the computer system (SYS) to read and/or write access said bit of the byte accessed by the digital signal processor (DSP) using: a bit position pointer (BITP) pointing towards the bit to be accessed in the byte array, and said byte (BTE_IN) including the bit to be accessed.

The method may include implementing a first block (NXTBBW) of the dedicated circuit (HWC) to calculate a byte shift value (OFFST) according to the value of the bit position pointer (BITP).

The implementation of the first block (NXTBBW) of the dedicated circuit (HWC) may cause: implementation of an "AND"-type logic gate (AND1) of the first block (NXTBBW) to perform an "AND"-type logic operation between the value of the bit position pointer (BITP) and the hexadecimal value 0x7 to obtain an index value (INDX), and implementation of a comparison circuit (COMPC) of the first block (NXTBBW) to calculate the byte shift value by comparing the index value (INDX) with 0, the byte shift value being equal to −1 when the index value is equal to 0 and equal to 0 otherwise.

The method may further include implementing a second block (READBIT) of the dedicated circuit (HWC) to determine the value of a bit to be read from the bit position pointer (BITP) and a byte (BTE_IN) may include said bit to be read.

The implementation of the second block (READBIT) of the dedicated circuit (HWC) may cause: implementation of an adder circuit (ADD1) of the second block (READBIT) to increase the value of the bit position pointer by 1, implementation of an "AND"-type first logic gate (AND2) of the second block (READBIT) to perform an "AND"-type logic operation between the increased value of the bit position pointer and a hexadecimal value equal to 0x7, implementation of a subtractor circuit (SUB1) of the second block (READBIT) to calculate a shift value (SL) by subtracting a value equal to 7 from the value at the output of the "AND"-type first logic gate (AND2), implementation of a shift circuit (SFT1) of the second block (READBIT) to shift to the right the value of the byte may include said bit to be accessed by a number of bits corresponding to said shift value (SL), and implementation of an "AND"-type second logic gate (AND3) of the second block (READBIT) to perform an "AND"-type logic operation between a value equal to 1 and the shifted value of the byte so as to obtain the value (BIT_OUT) of the bit to be read.

The method may include implementing instructions of the computer program (PRG) by the digital signal processor (DSP) causing at least one call of a function (RD_BIT_NW) to read a bit in the byte array (BTAB), each call of this function taking as input the bit position pointer and a byte pointer as attributes and causing: calculation of a byte shift value by said first block (OFFST), then update of the byte pointer with said byte shift value, then determination of the value of the bit to be read by said second block (READBIT) of the dedicated circuit (HWC).

The method may further include implementing a third block (WRITEBIT) of the dedicated circuit (HWC) to write the value of a bit instead of a bit pointed to by the bit position pointer (BITP) in a byte (BTE_IN) on which to write.

The implementation of the third block (WRITEBIT) of the dedicated circuit (HWC) may cause: implementation of an adder circuit (ADD1) of the third block (WRITEBIT) to increase the value of the bit position pointer by 1, implementation of an "AND"-type first logic gate (AND2) of the third block (WRITEBIT) to perform an "AND"-type logic operation between the increased value of the bit position pointer and a hexadecimal value equal to 0x7, implementation of a subtractor circuit (SUB1) of the third block (WRITEBIT) to calculate a shift value (SL) by subtracting a value equal to 7 from the value at the output of the "AND"-type first logic gate (AND2), implementation of a shift circuit (SFT2) of the third block (WRITEBIT) to shift to the left the value 1 by a number of bits corresponding to said shift value (SL) to create a mask (MSK), implementation of an inverter logic gate (NOT1) of the third block (WRITEBIT) to create a complementary mask (INVMSK) from said mask (MSK) obtained by implementation of the shift circuit (SFT2), implementation of an "AND"-type second logic circuit (AND4) of the third block (WRITEBIT) to apply the complementary mask (INVMSK) on the byte (BTE_IN) on which to write to obtain a first byte (B0), implementation of an "OR"-type logic circuit (OR1) of the third block (WRITEBIT) to apply the mask (MSK) on the byte (BTE_IN) on which to write to obtain a second byte (B1), and implementation of a selection circuit (MUX1) to generate a byte (BTE_OUT) corresponding to the first byte (B0) if the value of the bit to be written is equal to 0 or corresponding to the second byte (B1) otherwise.

The method may include implementing instructions of the computer program (PRG) by the digital signal processor (DSP) causing at least one call of a function (WRT_BIT_NW) to write a bit in the byte array (BTAB), each call of this function taking as input the bit position pointer and a byte pointer as attributes and causing: calculation of a byte shift value by said first block (OFFST), then update of the byte pointer with said byte shift value, then writing of the bit to be written by said third block (WRITEBIT) of the dedicated circuit (HWC).

The method may include implementing instructions of the computer program (PRG) by the digital signal processor (DSP) causing initiation of the bit position pointer so that it points towards the position of the last bit of the byte array (BTAB), and decrementing said bit position pointer (BITP) at each read and/or write access.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system comprising:
- a data memory configured to store a byte array;
- a program memory configured to store a computer program;
- a digital signal processor configured to execute the computer program to access each byte of the byte array; and
- a circuit that accesses a bit of a byte of the byte array by being configured to:
  - obtain a bit position pointer that points to the bit to be accessed in the byte array;
  - calculate a byte shift value according to a value of the bit position pointer;
  - obtain a byte that includes the bit to be accessed; and
  - determine a value of the bit to be read from the bit position pointer and the byte, wherein the circuit comprises:

an adder circuit configured to increase the value of the bit position pointer by 1;

a second logical conjunction gate configured to perform a second logical conjunction on the increased value of the bit position pointer and a hexadecimal value equal to 0x7;

a subtractor circuit configured to calculate a shift value by subtracting a value equal to 7 from the output of the second logical conjunction;

a shift circuit configured to shift to the right the value of the byte by a number of bits corresponding to the shift value; and a third logical conjunction gate configured to perform a third logical conjunction on a value equal to 1 and the shifted value of the byte to obtain the value of the bit to be read.

2. The system of claim 1, wherein the circuit includes:

a first logical conjunction gate configured to perform a first logical conjunction on the value of the bit position pointer and a hexadecimal value 0x7 to obtain an index value; and a comparison circuit configured to:

compare the index value and 0;

set the byte shift value to −1 when the index value is equal to 0; and set the byte shift value to 0 when the index value is not equal to 0.

3. The system of claim 1, wherein the computer program includes instructions that, when executed by the digital signal processor, cause the digital signal processor to perform at least one call of a read bit function to read a bit in the byte array, wherein each call of the read bit function has the bit position pointer and a byte pointer as inputs, wherein the instructions cause the digital signal processor to:

calculate a byte shift value;

update the byte pointer based on the byte shift value; and determine the value of the bit to be read based on the updated byte pointer.

4. The system of claim 1, wherein the circuit is configured to write the value of a bit instead of a bit pointed to by the bit position pointer in the byte on which to write.

5. The system of claim 4, wherein the circuit further comprises:

an adder circuit configured to increase the value of the bit position pointer by 1;

a second logical conjunction gate configured to perform a second logical conjunction on the increased value of the bit position pointer and a hexadecimal value equal to 0x7;

a subtractor circuit configured to calculate a shift value by subtracting a value equal to 7 from the value at the output of the second logical conjunction gate;

a shift circuit configured to shift to the left the value 1 by a number of bits corresponding to said shift value to create a mask;

an inverter logic gate configured to create a complementary mask from said mask obtained at the output of the shift circuit;

a fourth logical conjunction gate configured to apply the complementary mask to the byte on which to write to obtain a first byte;

a logical disjunction gate configured to apply the mask to the byte on which to write to obtain a second byte; and a selection circuit configured to:

output a byte corresponding to the first byte if the value of the bit to be written is equal to 0; and output the byte corresponding to the second byte if the value of the bit to be read is not equal to 0.

6. The system of claim 4, wherein the computer program includes instructions that, when executed by the digital signal processor, cause the digital signal processor to perform at least one call of a write bit function to write a bit in the byte array, wherein each call of the write bit function has the bit position pointer and a byte pointer as inputs, wherein the instructions cause the digital signal processor to:

calculate a byte shift value;

update the byte pointer based on the byte shift value; and write the value of the bit based on the updated byte pointer.

7. The system of claim 1, wherein the computer program includes instructions that, when executed by the digital signal processor, cause the digital signal processor to initiate the bit position pointer to point towards the position of the last bit of the byte array, and to decrement the bit position pointer at each read or write access.

8. A method implemented by a computer system for accessing a bit of a byte stored in a byte array the method comprising:

accessing, by a digital signal processor, the byte;

causing a circuit to access the bit of the byte accessed by the digital signal processor by:

obtaining a bit position pointer that points towards the bit to be accessed in the byte array;

obtaining the byte that includes the bit to be accessed; and accessing the bit of the byte based on the byte and the bit position pointer, wherein accessing the bit of the byte comprises determining the value of the bit to be read based on the bit position pointer and the byte that includes the bit to be read, and wherein determining the value of the bit to be read based on the bit position pointer and the byte includes:

incrementing, by an adder circuit, the value of the bit position pointer by 1;

performing, by a second logical conjunction gate, a second logical conjunction on the increased value of the bit position pointer and a hexadecimal value equal to 0x7;

subtracting, by a subtractor circuit, a value equal to 7 from the output of the second logical conjunction to obtain a shift value;

shifting, by a shift circuit, the value of the byte to the right based on the shift value; and performing, by a third logical conjunction gate, a third logical conjunction on a value equal to 1 and the shifted value of the byte to obtain the value of the bit to be read.

9. The method of claim 8, further comprising calculating, by the circuit, a byte shift value based on the bit position pointer.

10. The method of claim 9, wherein the circuit accesses the bit of the byte accessed by the digital signal processor by:

performing, by a first logical conjunction gate, first logical conjunction on the bit position pointer and a hexadecimal value 0x7 to obtain an index value;

comparing, by a comparison circuit, the index value to 0;

setting, by the comparison circuit, the byte shift value to −1 when the index value is equal to 0; and setting, by the comparison circuit, the byte shift value equal to 0 when the index value is not equal to 0.

11. The method of claim 8, wherein determining the value of the bit to be read is based on the bit position pointer and a byte pointer and includes:

calculating a byte shift value;

updating the byte pointer based on the byte shift value; and determining the value of the bit to be read based on the updated byte pointer.

12. The method of claim 8, further comprising writing the value of the bit instead of a bit pointed to by the bit position pointer in the byte on which to write.

13. The method of claim 12, wherein writing the value of the bit includes:

increasing, by an adder circuit, the value of the bit position pointer by 1;

performing, by a second logical conjunction gate, a second logical conjunction on the increased value of the bit position pointer and a hexadecimal value equal to 0x7;

subtracting, by a subtractor circuit, a value equal to 7 from the output of the second logical conjunction to obtain a shift value;

shifting, by a shift circuit, the value 1 to the left by a number of bits corresponding to the shift value to create a mask;

creating, by an inverter logic gate, a complementary mask based on the mask;

applying, by a fourth logical conjunction gate, the complementary mask to the byte to obtain a first byte;

applying, by a first logical disjunction gate, the mask to the byte to obtain a second byte;

selecting, by a selection circuit a byte corresponding to the first byte based on the value of the bit being equal to 0; and selecting, by the selection circuit, the byte corresponding to the second byte based on the value of the bit not being equal to 0.

14. The method of claim 12, wherein writing the value of the bit is based on the bit position pointer and a byte pointer and includes:

calculating a byte shift value;

updating the byte pointer based on the byte shift value; and writing the bit based on the updated byte pointer.

15. The method of claim 8, further comprising:

initiating the bit position pointer to point to a position of the last bit of the byte array; and decrementing the bit position pointer at each access.

* * * * *